March 22, 1966 R. A. HUFFORD 3,241,185
EXTRUDER WITH MEANS TO VARY RAM PRESSURE
Filed July 22, 1963 4 Sheets-Sheet 3
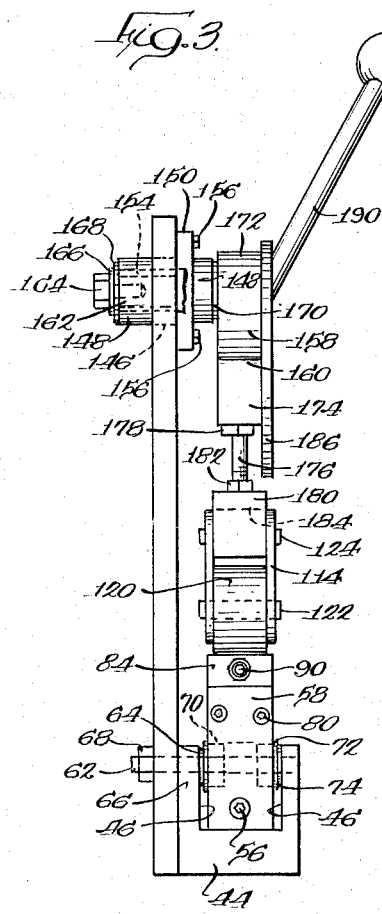
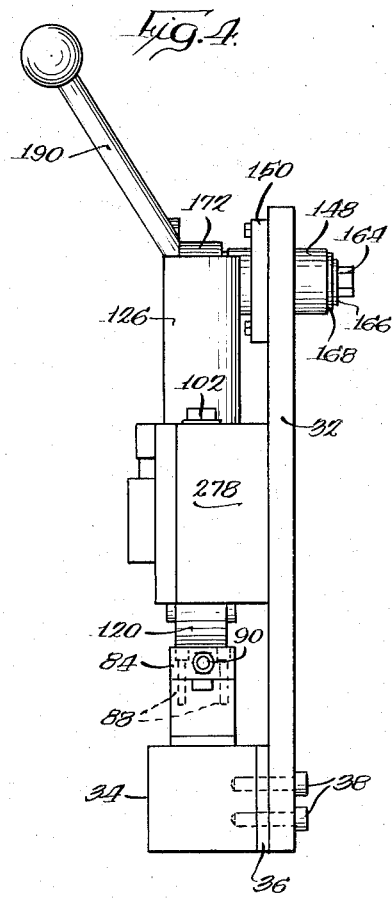
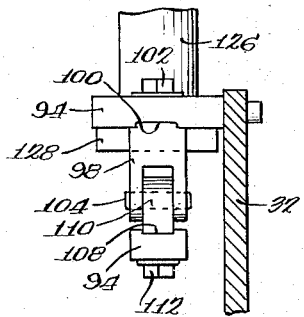
INVENTOR.
Richard A. Hufford
BY
Bradolph, Love & Rogers
Att'ys

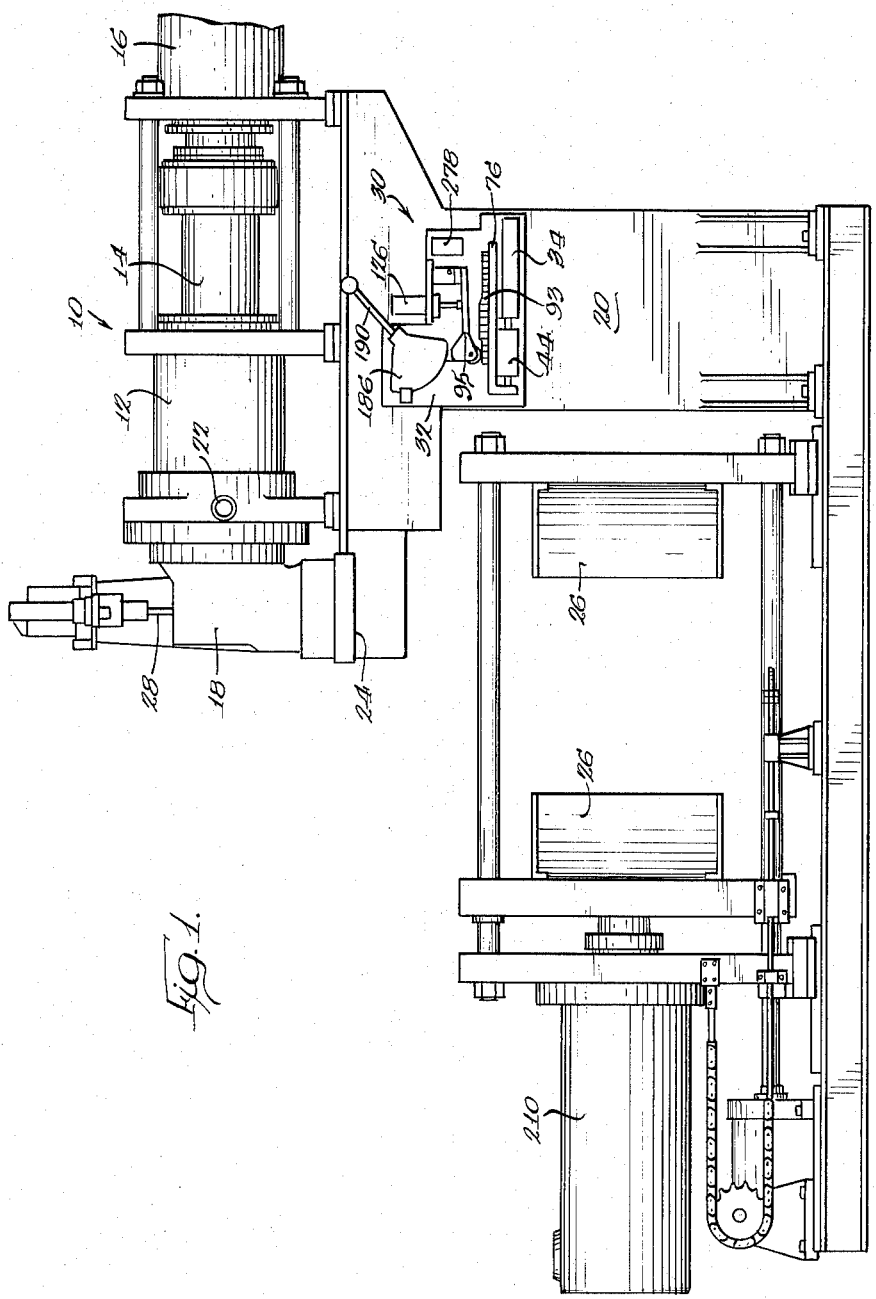

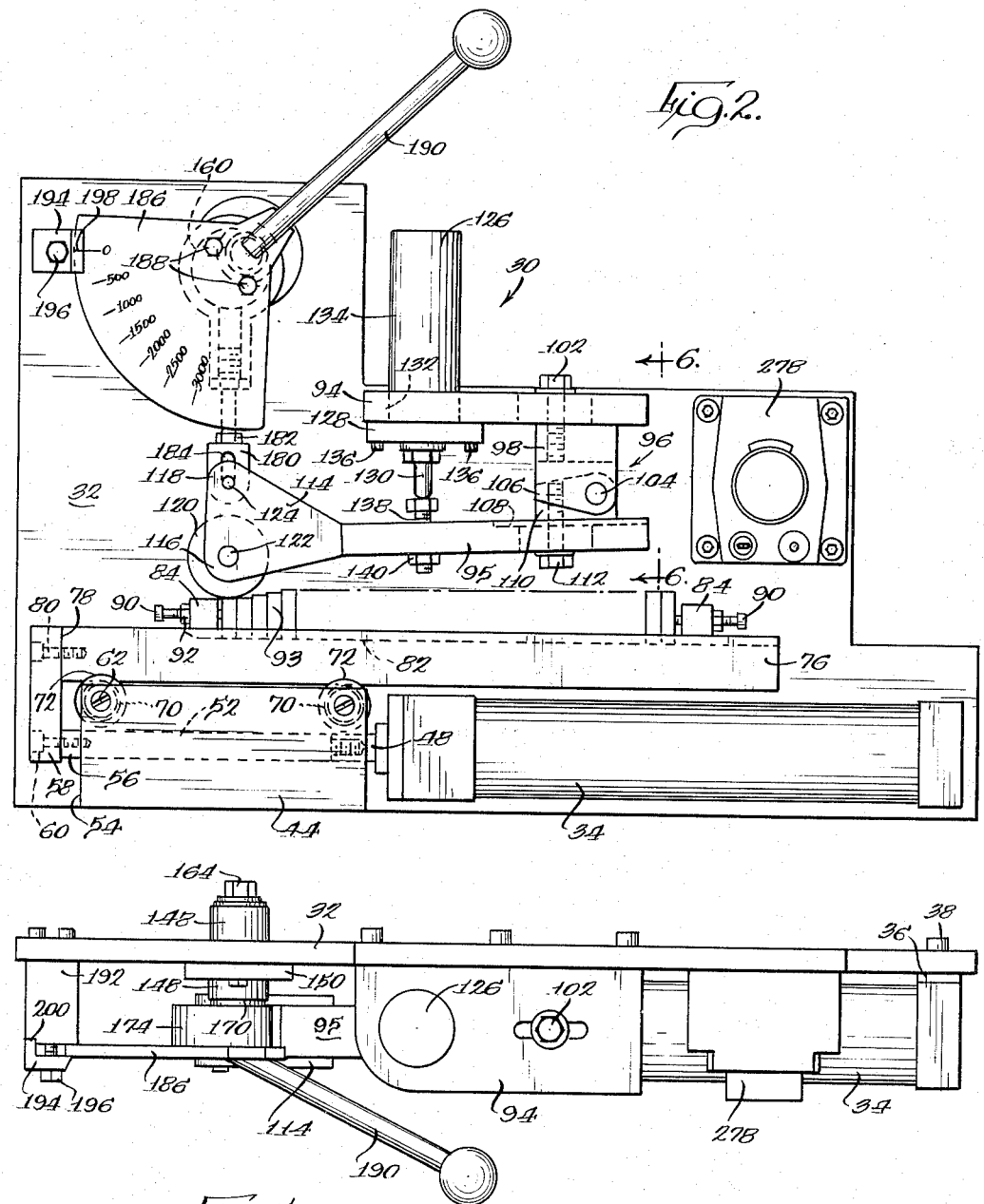

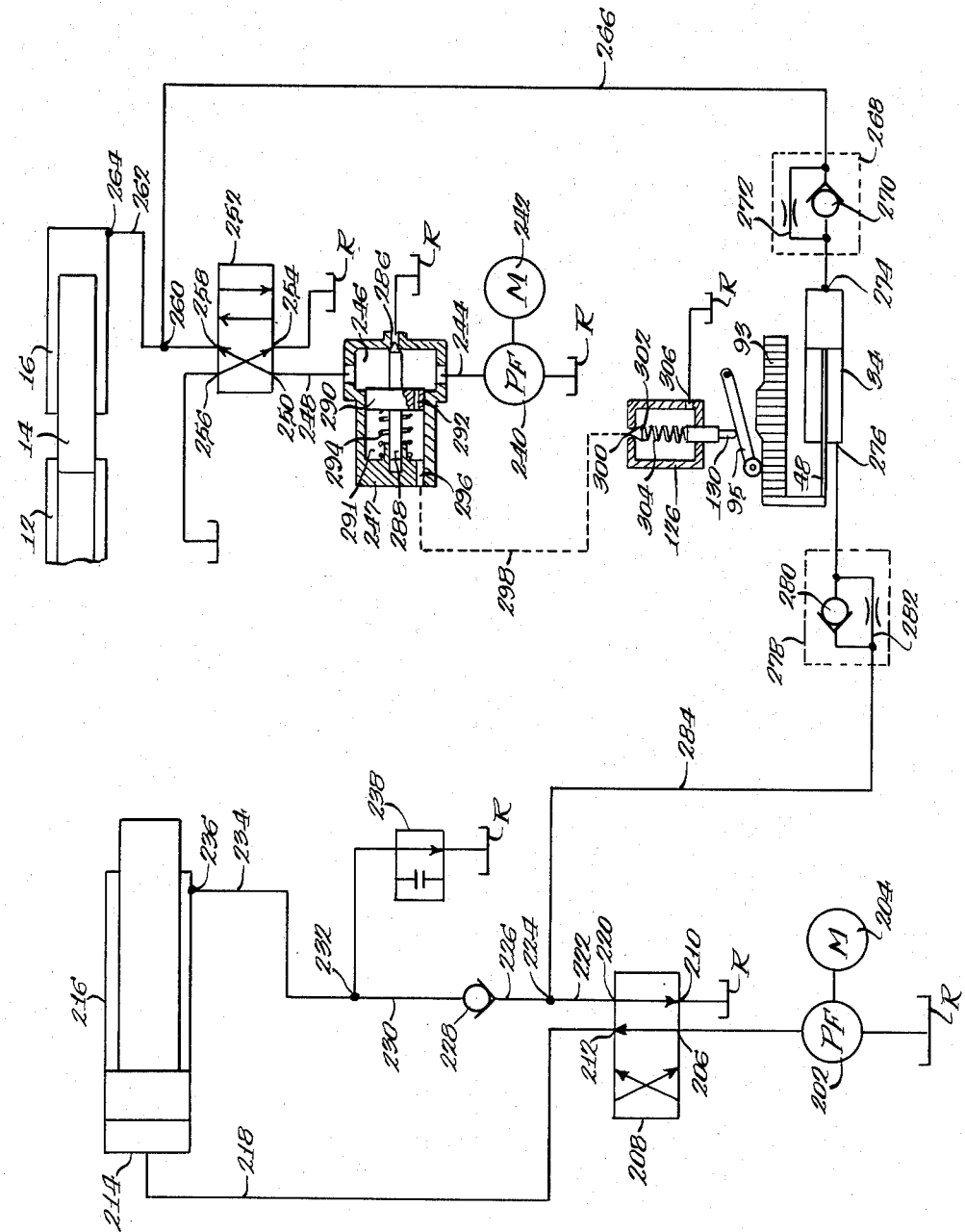

United States Patent Office 3,241,185
Patented Mar. 22, 1966

3,241,185
EXTRUDER WITH MEANS TO VARY
RAM PRESSURE
Richard A. Hufford, Moline, Ill., assignor to Williams,
White & Company, Moline, Ill., a corporation of
Illinois
Filed July 22, 1963, Ser. No. 296,721
4 Claims. (Cl. 18—14)

My invention relates to a parison control for a plastics molding machine.

As is well known, the process of blow molding of plastic materials generally involves extruding a tube or parison of plasticized polymer in a downward direction. When a parison of sufficient length has been formed, the parison is enclosed between mold halves and blown out against the interior cavity of the mold formed by the halves.

Molding machines are fed by extruders which have a limited output per unit of time. In blowing large objects particularly, the parison may call for softened polymer production at a far greater rate than an extruder is capable of. To meet this difficulty the extruder output is fed into an accumulator which is simply a cylinder with a ram therein, and when sufficient polymer has collected in the accumulator, it is expelled with great rapidity by the ram. It is desirable that the pressure of expulsion be adjustable to fit the material employed, the relative fluidity of the material at a particular temperature and the parison characteristics desired.

Even in working with one particular material at a certain temperature and extruding it through a particular parison die to form a particular product, variations of parison extrusion pressure within a relatively narrow range provide the most flexible and easily adjusted means for controlling the parison wall thickness to enlarge it where certain blown sections are too thin or to reduce it where blown sections are unnecessarily heavy.

Even more pertinently, however, it is often desirable that the wall thickness of the parison for any particular job vary over its length. For instance, the machine illustrated here has been employed for blowing 55 gallon drums, and in the drawings hereof, a mold appropriate for such container is shown. It will be evident that the portions of the parison which go to form the juncture between the side wall and ends and the side wall and end portions adjacent thereto will be stretched and thinned substantially more than the portions of the parison which go to make up the central part of the cylindrical side walls and of the ends. To obtain a wall thickness in these areas of juncture more uniform with the naturally thicker parts, therefore, it is evident that the parison portion forming these areas should contain a greater quantity of material.

It is known that plasticized polymers such as polyethylene and the like are compressible to a certain degree. Under a certain pressure, for instance, material extruded through a parison die having a diameter of ten inches and a wall gap of a quarter inch might emerge as a parison meeting substantially those dimensions. If the extrusion pressure is substantially increased, there will be both an augmentation of the wall thickness of the parison and a bulging of the parison immediately upon emergence from the parison die. This parison portion might swell to a diameter of eleven inches and increase in wall thickness to three-eighths of an inch.

My invention has for a particular object the provision for a parison control which may vary continuously between limits the pressure of parison extrusion.

My invention has for a further particular object the provision of such control whereby a parison may be formed having different quantities of material per unit of length over its length.

Still another object is the provision of a control whereby the wall thickness and the diameter of a parison may be varied by varying the pressure applied in the formation thereof.

Yet another object is the provision of a control as described, whereby the section of a parison may be varied in direct relation to the evolution of the parison as a whole; in other words, where a variation is wanted at a particular point over the length of the parison, the proportion of the parison that has already evolved dictates the location of the variation.

My invention is further notable for its simplicity of construction, for its certainty and accuracy of operation, and for its ready incorporation into a blow molding machine of the character described lacking such control provision.

Other objects and advantages will be apparent from the following description and drawings, of which:

FIG. 1 is a side elevation of a blow molding machine incorporating an embodiment of the control of my invention;

FIG. 2 is an enlarged front elevation of the control mechanism;

FIG. 3 is an elevation of the left end of the mechanism as illustrated in FIG. 2;

FIG. 4 is an elevation of the right end of the mechanism illustrated in FIG. 2;

FIG. 5 is a top plan view thereof;

FIG. 6 is a fragmentary end elevation taken substantially along the line 6—6 of FIG. 2, looking in the direction of the arrows; and FIG. 7 is a diagrammatic representation of the hydraulic circuit constituting a part of my invention.

In FIG. 1, I show a parison extruder 10 which includes an accumulator 12, an accumulator ram 14, a hydraulic cylinder 16 for operating the ram, and a die head 18 mounted on a pedestal 20. Plasticized polymer is fed from an extruder, not shown, into the accumulator 12 through a port 22 as is more fully described in my copending application Serial No. 295,485, filed July 16, 1963, entitled, "Simultaneously Closing Blow Molding Machine." When a sufficient quantity of polymer is present in the accumulator to form a parison and the machine is otherwise ready for an operating cycle, the ram 14 is advanced into the accumulator by hydraulic pressure in the cylinder 16 to extrude the polymer out through an annular die contained in the bottom face 24 of the die head as a tubular parison. Mold halves 26, which together define a mold, are situated below the die head so that the parison is extruded between them. When the parison is completed, the mold halves close on it, and a blower pipe 28 is extended downward centrally of the parison through the die head and into blowing relation with the mold to expand the parison portion contained in the mold against the inside wall thereof.

The control mechanism 30 of my invention is shown mounted to the pedestal 20 of the blow molding machine, although it may equally well be entirely separate from it. The mechanism consists of a panel 32 which may be fixed in any appropriate fashion to the face of the pedestal 20. The panel has a double acting parison control cylinder 34 mounted horizontally along the bottom edge thereof with a spacer 36 interposed between the panel and cylinder to space the cylinder out a short distance from the panel. Bolts 38 may extend through the panel from the back side thereof and through the spacer into tapped bores in the head and rod ends 40 and 42 of the cylinder to secure the cylinder to the panel.

A guide roller bracket 44, generally U-shaped in cross section, is likewise mounted horizontally along the bottom edge of the panel, channel 46 side up, off the rod end 42 of the cylinder 34. The bottom of the channel 46 is spaced slightly below the rod 48 of the cylinder so that the rod may be extended into the channel of the bracket.

The rod 48 has a tapped bore 50 in the end thereof into which an extension 52 is threaded. The extension extends beyond the distant end 54 of the bracket and has a tapped bore 56 therein at the outer end. The lower end of a rectangular cam holder block 58 is secured against the outer end of the rod extension by a screw 60 extending into the tapped bore 56. The cam holder block extends well up above the level of the guide roller bracket 44.

The guide roller bracket is secured against the panel by a pair of roller shafts 62. The shafts extend across the upper edges of the bracket 44, spanning the channel 46, and through the panel 32. The shafts are shouldered down as at 64 to bear against the inner side 66 of the channel and threaded at their ends, and nuts 68 on the back side of the panel 32 secure the shafts and the bracket to the panel. A pair of rollers 70 having outer flanges 72 is mounted on each of the shafts. Washers or bearings 74 may be interposed on the shaft between the rollers and the bracket side to ease movement of the rollers.

A cam holder 76 is secured at one end 78 to the upper end of the cam holder block 58 to extend retroversely back over the extension 52 and cylinder 34. The connection to the cam holder block is made by screws 80 extending through the block and into the end of the cam holder.

The cam holder is a relatively long block somewhat wider than deep. It has a longitudinal groove 82 milled in the top edge thereof and a pair of cam clamps 84 secured to the top surface generally at each end of the groove 82. The cam clamps 84 consist of blocks substantially square in cross section extending across the top of the cam holder 76 and secured thereto by a pair of screws 88. Clamping screws 90 extend through central tapped holes therein toward each other in vertical alignment with the groove 82. Jam nuts 92 will be provided on the clamping screws 90 to lock them in place. The clamping screws will clamp in place a cam, shown here as a series of cam segments 93. The segments are vertical blocks of varying height seated at their bottom ends in grooves 92. The blocks may be used as the final cam or may be used to determine a wanted profile, after which a one piece cam may be substituted.

The bottom edges of the cam holder 76 ride on the guide rollers 70 between the flanges 72 thereof so as to be supported by the rollers. It will be evident that the extension or retraction of the rod 48 will have the effect of moving the cam holder back and forth on the rollers.

A rectangular plate 94 extends horizontally out from the panel 32 a substantial distance above the cylinder 34 and constitutes a pressure relief valve bracket. The bracket may be secured to the panel by welding or by bolts. At that end of the relief valve bracket nearest the head end 40 of the cylinder 34, a cam follower arm 95 is pivotally mounted by a hinge structure 96.

Referring particularly to FIG. 6, the hinge structure consists of a downwardly extending clevis 98 having a rib 100 on its top side. A longitudinal groove is formed in the under side of the bracket 94 with which the rib conforms. A screw 102 secures the clevis against the under side of the bracket with the rib engaged in the slot to secure the clevis against any possibility of rotation. A pin 104 spans the arms 106 of the clevis adjacent their lower end.

The cam follower arm 95 is a long flat bar somewhat wider than high. At its hinged end it has a longitudinal groove 108 formed in the top surface thereof. A block 110 is secured in the slot 108 by a screw 112 and extends up between the arms of the clevis and is mounted on the clevis pin 104.

The other end of the cam follower arm 95 has a pair of triangular plates 114 secured to the sides thereof as by welding at one of the apices thereof so that, of the remaining apices, the lower, 116, are below the bottom line of the arm and the upper, 118, are above the top line of the arm. A yoke or bracket is thus defined. A cam follower or roller 120 is mounted on a pin 122 between the lower apices 116 of the plates. A yoke pin 124 extends between the upper apices 118 of the plates. As will be appreciated from the drawing, the cam follower arm extends from the pivot assembly in the direction of the rod end of the cylinder 34 and the arm is of such a length that the cam roller 120 is situated above and between the guide rollers 70. Any pressure, therefore, which the cam follower arm applies to the cam holder 76 will be carried by the rollers and no transverse thrust will be applied to the rod or rod extension 48 or 52 of the cylinder 34.

The relief valve bracket 94 also supports a pressure relief valve 126 in a position above the central portion of the cam follower arm 95. The pressure relief valve has a large diameter flange 128 about its lower end and a plunger 130 extending below the flange. A hole 132 is formed in the bracket 94 to receive the body 134 of the relief valve, the flange 128 bottoming up against the under side of the bracket. The relief valve is secured to the bracket as by bolts 136. The plunger 130 will be positioned above the center line of the cam follower arm 95 in the central portion thereof. The cam follower arm mounts a relief valve actuator 138 which consists of a headed bolt threaded into an appropriately tapped vertical bore in the cam follower arm and having a jam nut 140 also mounted thereto. The head of bolt or actuator 138 may thus be adjusted in its bore to intercept the plunger 130 at any desired point in the cam follower arm motion.

A control lever assembly 144 is also mounted to the panel 32 above the swinging end of the cam follower arm 95. A hole 146 is formed in the panel through which a bearing hub 148 is extended to project both front and rear of the panel. The hub has a mounting flange 150 thereon which is secured to the panel as by screws 152. A sleeve 154 is contained within the hub. An eccentric member 158 having a circular eccentric 160 and a shaft 162 extending from the eccentric away from center thereof is mounted by its shaft within the bearing 154, the eccentric being situated to the front of the bearing hub 148. A screw 164 extends through a washer 166 and a thrust bearing 168 into a tapped bore in the end of the shaft to secure the shaft within the hub 148. A thrust bearing 170 is likewise interposed between the hub and the eccentric 160 proper.

A circular yoke 172 is mounted on the eccentric 160 and has a downwardly extending shank 174. The shank 174 is interiorly threaded at its lower end for the reception of one end of a yoke rod 176, fitted with a jam nut 178. The other end of the yoke rod is threaded into an appropriately tapped hole in a block 180. This end likewise is equipped with a jam nut 182. Block 180 is proportioned to fit between the triangular plates 114 and has a longtiudinal slot 184 therein which receives the pin 124.

A quadrant 186 is secured to the outer face of the eccentric by screws 188. The mounting is coaxial with the shaft 162 so that the quadrant rotates about its center. The quadrant has an operating lever or handle 190 extending from the apex thereof opposite to the periphery of the quadrant and, as illustrated, at a slight outward angle. The handle may be secured to the face of the quadrant by welding or other appropriate means. The quadrant will be scaled between zero and maximum accumulator extrusion pressure.

A control lever clamping post 192 is secured to the panel to a point just underlying the arcuate edge of the quadrant 186. A clamp 194 is secured to the end of the post 192 by a bolt 196, and the arcuate periphery of the quadrant is embraced between the clamp 194 and the end of the post 192. The portion of the clamp 194 which overlies the quadrant periphery has an indicator line 198 thereon with which the scale readings will register. The clamp includes a lug 200 on its back edge received within an appropriate notch in the post 192 to prevent rotation of the clamp about the bolt 196. Tightening of the bolt 196 will lock the quadrant and therefore the eccentric 160 firmly against rotation.

In FIG. 7, I illustrate the hydraulic system by which the parison control of my invention is achieved. The sequential functioning of various stages of the hydraulic control illustrated is largely derived from electrical controls closely analogous to those set forth in Patent No. 3,110,928, issued November 19, 1963, to Eugene G. Engman, "Apparatus for Blowing Large Articles." Since such circuitry is fully described in that application, further description is believed unnecessary and has therefore not been illustrated.

The hydraulic circuit illustrated in FIG. 7 shows a clamp pump 202 powered by a motor 204 and connected to withdraw oil from a reservoir R and deliver it to a port 206 on the inlet side of a four-way valve 208. The other port 210 on the inlet side is connected to reservoir R. Port 212 on the outlet side of the valve 208 is connected to the head end 214 of the clamp cylinder 216 by a duct 218. The other port 220 on the outlet side of the valve 208 is connected by duct 222, T 224, duct 226, check valve 228, duct 230, T 232, and duct 234 to the rod end 236 of the clamp cylinder 216. T 232 is also connected to a two-way valve 238 having an outlet connected to reservoir R. The check valve 228 is oriented to forbid flow from the rod end 236 of the clamp cylinder to the four-way valve 208.

An accumulator pump 240 powered by a motor 242 is connected to withdraw oil from reservoir R and deliver it through a duct 244, a through passage 246 of a valve 247, and duct 248 to an inlet port 250 of a four-way valve 252. The other port 254 on the inlet side of the four-way valve is connected to reservoir R. Port 256 on the outlet side of the valve is connected to reservoir R. The other port 258 on the outlet side is connected through T 260 and duct 262 to the head end 264 of the single acting accumulator ram cylinder 16.

T 260 is also connected through duct 266 to one side of a fluid control restrictor valve 268 which incorporates a check valve 270 and a restricted bypass 272. The other side of valve 268 is connected to the head end 274 of the double acting parison control cylinder 34. The check valve 270 is oriented to restrain retraction of the rod 48 of cylinder 16. The rod end 276 of the control cylinder is connected to one side of a second fluid control restrictor valve 278 which also includes a check valve 280 and a restricted bypass 282. The check valve 280 is oriented to restrain the extension of the rod 48 of cylinder 16. The flow rate of the bypass is adjustable, and the valve 278 is mounted to the face of panel 32 for ready accessibility for adjustment (FIG. 2). The other side of the valve 278 is connected through duct 284 to the T 224 in the clamp cylinder circuit.

Valve 247 is a balanced-piston type, pilot operated relief valve. It includes the beforementioned through passage 246 and a side passage 286 connected to reservoir R and normally closed by a poppet 288. Poppet 288 includes a piston 290 having a bore 292 therethrough and is lightly loaded to close by a spring 294. The valve body back of the piston 290 defines a chamber 291 having a port 296 which is connected by pilot duct 298 to the inlet 300 of the pressure relief valve 126. The pressure relief valve includes a poppet 302 biased to closure by spring 304. The spring bears at its other end against the plunger 130 and is variably compressed thereby. In other words compression on the plunger 130 by the cam follower arm 95 controls the relief pressure of valve 126. Valve 126 is connected at its outlet 306 to reservoir R.

The operation of my device will be readily appreciated from the foregoing description. The illustrated quadrant 186 is scaled from 0 to 3600 pounds p.s.i. extrusion pressure. By appropriate adjustment of the relief valve actuator 138 and the yoke rod 176, for instance, actual extrusion pressures can be calibrated to the quadrant scale. Again, in the illustrated embodiment, the pressure should read 0 pounds with a one inch cam under the cam roller and 3600 pounds with a 1.72 inch cam under the roller. In other words each .1 inch of cam rise is the equivalent of 500 pounds p.s.i. in extrusion pressure. Also the vertical reciprocation or throw of the eccentric 160 is .72 inch within the 90° movement capability of the quadrant 186.

To extrude a parison under constant pressure, it is only required that the quadrant be set to the desired pressure on its scale. The corresponding rotation of the eccentric will raise the cam follower arm to the desired proportion of the .72 inch possible movement. The arm, being heavy and also being spring biased downwardly to some extent by the spring within the pressure relief valve 126, will hang from the lower end of the slot 184 in the block 180, occupying thus its lowest permitted position. Raising of the follower arm moves the plunger 130 of the pressure relief valve 126 upwardly to compress the spring and establish the pressure of relief at the desired level. Thereafter when the motor 242 is started to operate the pump 240, fluid flow occurs through passage 246 of the valve 247 and thence through the four-way valve 252, T 260 and duct 262 to the accumulator cylinder 16. Pressure buildup continues with the poppet 288 of valve 247 remaining closed until the pressure in the system, communicated to relief valve 126 by duct 298, exceeds the spring 304 counter pressure therewithin. Until this time, valve 126 remains closed and there is a static fluid condition within the valve 247. The pressure on the piston 290 of the poppet 288 is equal on both sides thereof and the spring 294 therefore holds the poppet against the outlet or side passage 286. When the pressure setting of valve 126 is exceeded, the pressure forces the poppet 302 of that valve open and fluid is thereby permitted to flow through the valve to reservoir. This has the effect of dropping the pressure back of the piston 290 in chamber 291 so that the pressure in the through passage 246 is sufficiently greater to overcome spring 294, and the poppet thereupon moves to open the side passage 286, diverting fluid from the head end of cylinder 16 and holding the pressure at the desired level therein. It will thus be appreciated that the position of the cam follower arm controls the pressure within the accumulator cylinder 16.

For a parison of variable thickness, the parison control cylinder 34 and cam 93 are employed. It will be appreciated that in the process of parison extrusion, fluid pressure will be delivered to the parison control cylinder 34 at the same time as pressure is applied to the accumulator cylinder 16. That is, as pressure is applied to the head end of the accumulator cylinder through the four-way valve 252, the pressure is tapped off through T 260, duct 266 and valve 268 to the head end of the parison control cylinder. The function served by valve 268 will be described later. Since cylinder 34 is a double acting cylinder, fluid entry into the head end requires fluid evacuation from the rod end thereof. Thus the rod end fluid flows from port 276 through valve 278 and duct 284 to T 224 in the clamping cylinder hydraulic circuit. From T 224, it flows to reservoir R through the four-way valve 208. Valve 278 contains the restricted bypass 282 through which fluid flow must occur in the evacuation of the rod end. The flow through the bypass 282 is adjustable so that any desired proportion, within a limited range, of the output of pump 240 can be diverted to the parison control cylindrical 34.

Since, in the extrusion of a parison, a common pressure source is supplied both to the accumulator cylinder 16 and to the parison control cylinder 34, the rods of the two cylinders will move at proportionate rates. The proportion may be varied by adjusting the flow through valve 278, but the condition of proportionate movement will remain.

In most instances, a parison will not require a full stroke of the ram 14. As stated before, the machine is intended for a wide range of uses and it will be only rarely that a maximum parison is called for. The travel of the ram therefore will be limited and will vary as between jobs. It is desirable, however, for the greatest possible precision in cam tracking, that the full length of the available cam movement be employed. Valve 278 will therefore be adjusted to obtain as close to full cam travel as possible regardless of the length of ram travel.

To obtain a parison of variable wall thickness, a cam 93 is inserted in the cam holder. This may take the form of a plurality of blocks as illustrated in FIG. 2 for the initial determination of a cam profile.

When pressure is delivered to the ram to begin extrusion of the parison, pressure is likewise delivered to the head end of the control cylinder 34 through the check valve 270 of valve 268. The rod 48 of the cylinder will thereby be extended and move the cam holder to the right. The cam will have a certain minimum height greater than one inch so that the cam follower arm will be forced upwardly against the plunger 130 of valve 126 and so compress the spring 304. As will be appreciated from the foregoing description, the loading of spring 304 determines the pressure of parison extrusion. The same pressure will of course be communicated to the head end of the cylinder 34.

When a rise is encountered in the cam, the cam follower arm 95 is forced upwardly to load further the spring 304. The pressure of relief of valve 247 is thereby increased, accelerating the travel of the accumulator ram 14. By the same token the pressure communicated to the head end of cylinder 34 is increased to accelerate comparably the travel of the rod 48 thereof. With such an increase in pressure the internal compression of the plastic will be greater and the plastic, as it emerges from the die head, will bulge and swell to provide a parison section of greater material per unit of length than the section developed where the cam follower is riding on the low part of the cam 93.

Although the correspondence of the movement of the cam to the accumulator ram is relatively precise, it is generally desirable that the cam be finally adjusted empirically. To this end, blocks of different height may be substituted in the illustrated cam to determine exactly the parison profile wanted, and thereafter, if a protracted run of moldings is to be made, a single piece cam may be substituted.

When the parison is completed, the four-way valve 252 is shifted from its illustrated position and the pump output is connected from duct 248 to valve port 256 and thence to reservoir. Since plastic is being continually fed into the accumulator, the accumulator ram 14 will be gradually forced back by it and the fluid contained in the cylinder 16 returns to reservoir through line 262, T 260 and ports 258 and 254 of the four-way valve 252.

It is necessary, of course, that the control cylinder 34 be returned to its starting position before the commencement of any new cycle. This occurs when the four-way valve 208 is reversed to retract the clamp cylinder 216. Reversal of valve 208 directs fluids to the rod end 236 of the cylinder 216 through port 220, duct 222, T 224, duct 226, check valve 228, duct 230, T 232, and duct 234. With the reversal of four-way valve 208, the two-way valve 238 will likewise be reversed to block discharge on the output side of the pump to reservoir. The fluid returns from the head end of the clamp cylinder 216 to reservoir by duct 218 and ports 212 and 210 of the four-way valve 208.

T 224 being connected to the output pressure of the pump 202, fluid also flows through duct 284 to valve 278. In this direction, the flow occurs through the check valve 280 into the rod end of the control cylinder 34 to retract the rod thereof. Fluid escapes from the head end of cylinder 34 through the valve 268. In this direction of flow, the check valve 270 is closed and flow must therefore occur through the restricted passage 272 which prevents excessive pressure application and rate of traverse to the cylinder 34. The fluid from the head end of cylinder 34 returns through duct 266 and T 260 to reservoir R through valve 252, ports 258 and 254.

It will be appreciated from the foregoing description that I have invented a device for controlling parison extrusion pressure which is simple, versatile, accurate and which permits a variation in pressure of extrusion over the length of a parison so as to vary certain sections thereof. In its simplest expression my invention may perhaps best be characterized as a cam or cam follower tracking the movement of the accumulator ram and thereby controlling pressures continuously in the evolution of the polymer parison. It will be evident within this characterization that many alternatives to the precise mechanism described may be employed to the achievement of this purpose without departing from the spirit of the invention, and I therefore desire that my invention be regarded as being limited only as set forth in the the following claims.

I claim:

1. In an extrusion machine including an accumulator, a die head, an accumulator ram for expelling plastic polymer from said accumulator through said die head to form a parison, and a hydraulic system for advancing said ram into said accumulator including a constant pressure pump, a hydraulic cylinder, and a duct connecting said pump and said cylinder; a continuously variable accumulator pressure control comprising means defining a pressure relief port in said system, valve means normally closing said port, and a remote, continuously adjustable, hydraulic pressure relief valve hydraulically connected to said valve mean to cause said valve means to open upon the attainment of a particular pressure in said system determined by the adjustment of said valve.

2. In an extrusion machine including an accumulator, a die head, an accumulator ram for expelling plastic polymer from said accumulator through said die head to form a parison, and a system for advancing said ram into said accumulator including a constant pressure pump, a hydraulic cylinder, and a duct connecting said pump and said cylinder; an accumulator pressure control comprising a cam assembly including a cam and a cam follower, means mounting one of the members of said cam assembly for movement in coordination with said ram, continuously variable pressure relief valve adapted to be actuated by said cam follower to vary the pressure of relief, means defining a normally closed pressure relief port in said system, and means responsive to said variations in relief pressure to vary continuously and proportionately the pressure in said system by selectively opening said relief port.

3. In an extrusion machine including an accumulator, a die head, an accumulator ram for expelling plastic polymer from said accumulator through said die head to form a parison, and a system for advancing said ram into said accumulator including a constant pressure pump, a hydraulic cylinder, and a duct connecting said pump and said cylinder; an accumulator pressure control comprising a cam assembly including a cam and a cam follower, means mounting one of the members of said cam assembly for movement in coordination with said ram, and means defining a pressure relief port in said system, means resiliently loaded to closure closing said relief port, and means responsive to the movement of said cam follower for varying the loading of said resiliently loaded means.

4. In an extrusion machine including an accumulator, a die head, an accumulator ram for expelling plastic polymer from said accumulator through said die head to form a parison, and means for delivering hydraulic fluid under pressure to said ram to advance said ram into said accumulator including a first hydraulic cylinder; an accumulator pressure control comprising a second hydraulic cylinder, means connecting said cylinder to said fluid delivery means, a cam mounted to the rod of said cylinder to be moved thereby at a rate proportionate to that of said ram in expelling said polymer, a cam follower engaging said cam, and means controlled by said cam follower for varying the pressure applied to said ram.

References Cited by the Examiner
UNITED STATES PATENTS

| | | | |
|---|---|---|---|
| 2,871,516 | 2/1959 | Sherman et al. | 18—30 |
| 2,983,956 | 5/1961 | Vogel et al. | 18—30 |
| 3,002,615 | 10/1961 | Lemelson | 18—21 X |
| 3,029,471 | 4/1962 | Adams et al. | 18—5 |

J. SPENCER OVERHOLSER, *Primary Examiner.*

MICHAEL V. BRINDISI, *Examiner.*